United States Patent
Hughes

(10) Patent No.: US 8,898,951 B2
(45) Date of Patent: Dec. 2, 2014

(54) DOUBLE FISHING LURE

(75) Inventor: Timothy Richard Hughes, Reeds Spring, MO (US)

(73) Assignee: Bass Pro Intellectual Property L.L.C., Springfield, MO (US)

( * ) Notice: Subject to any disclaimer, the term of this patent is extended or adjusted under 35 U.S.C. 154(b) by 101 days.

(21) Appl. No.: 12/388,271

(22) Filed: Feb. 18, 2009

(65) Prior Publication Data

US 2010/0205848 A1 Aug. 19, 2010

(51) Int. Cl.
*A01K 85/18* (2006.01)
*A01K 85/16* (2006.01)
*A01K 85/00* (2006.01)
*A01K 91/06* (2006.01)

(52) U.S. Cl.
CPC .............. *A01K 85/16* (2013.01); *A01K 91/06* (2013.01)
USPC ....... 43/42.15; 43/42.05; 43/42.36; 43/42.39; 43/42.45; 43/42.47; 43/42.48

(58) Field of Classification Search
USPC ............ 43/42.15, 42.36, 42.39, 42.47, 42.48, 43/42.45, 42.05
See application file for complete search history.

(56) References Cited

U.S. PATENT DOCUMENTS

| | | | | |
|---|---|---|---|---|
| 779,083 A * | 1/1905 | Jamison | ........................ | 43/42.39 |
| 887,765 A * | 5/1908 | Buschemeyer | .............. | 43/42.39 |
| 1,243,391 A * | 10/1917 | Donaly | ........................ | 43/42.15 |
| 1,499,975 A * | 7/1924 | Ford | .............................. | 43/42.39 |
| 1,535,957 A * | 4/1925 | Stanley et al. | ................ | 43/42.39 |
| 1,627,455 A * | 5/1927 | Peterson | ........................ | 43/42.36 |
| 1,698,735 A * | 1/1929 | Roberts | ........................ | 43/42.48 |
| 1,791,316 A * | 2/1931 | Jordan | .......................... | 43/42.15 |
| 1,870,559 A * | 8/1932 | Drake | ........................... | 43/42.47 |
| 2,181,254 A * | 11/1939 | Wilson | .......................... | 43/42.39 |
| 2,183,816 A * | 12/1939 | Lovelace | ...................... | 43/42.39 |
| 2,184,031 A * | 12/1939 | Wyatt | ........................... | 43/42.39 |
| 2,187,475 A * | 1/1940 | Lauby | ........................... | 43/42.36 |
| 2,233,684 A * | 3/1941 | Strite | ............................ | 43/42.15 |
| 2,238,832 A * | 4/1941 | Thoren | ......................... | 43/42.15 |
| 2,523,949 A * | 9/1950 | Gambill | ........................ | 43/42.36 |
| 2,559,542 A * | 7/1951 | Mintner | ........................ | 43/42.15 |
| 2,588,720 A | 3/1952 | Heiland | | |
| 2,618,094 A * | 11/1952 | Shindler | ....................... | 43/42.24 |
| 2,644,265 A * | 7/1953 | Stettner | ......................... | 43/42.39 |
| 2,685,145 A * | 8/1954 | Dean | ............................. | 43/42.15 |

(Continued)

FOREIGN PATENT DOCUMENTS

| | | | | | |
|---|---|---|---|---|---|
| JP | 2008173039 A | * | 7/2008 | ............. | A01K 85/18 |
| JP | 2008211976 A | * | 9/2008 | ............. | A01K 85/18 |
| JP | 2009060863 A | * | 3/2009 | ............. | A01K 85/18 |

*Primary Examiner* — Darren W Ark
(74) *Attorney, Agent, or Firm* — Pillsbury Winthrop Shaw Pittman LLP

(57) ABSTRACT

A fishing lure includes a leading lure body shaped like a fish; and a trailing lure body shaped like a fish. The leading lure body includes a passage therethrough to enable a fishing line to slidably pass through the passage for connection to the trailing lure body. The trailing lure body includes a front portion and a curved front surface. The front portion of the trailing lure body is weighted such that the trailing lure body tends to sink front portion first in water. The curved front surface of the trailing fishing lure facilitates a swimming motion for the trailing lure body when the trailing lure body moves through water, and tends to lift the trailing lure body if the trailing lure body is pulled through water.

12 Claims, 8 Drawing Sheets

(56) References Cited

U.S. PATENT DOCUMENTS

| | | | | | |
|---|---|---|---|---|---|
| 2,693,049 | A | * | 11/1954 | Atton | 43/42.39 |
| 2,734,301 | A | * | 2/1956 | Fuqua | 43/42.39 |
| 2,742,729 | A | * | 4/1956 | Mcvay | 43/42.48 |
| 2,746,200 | A | | 5/1956 | Dale | |
| 2,749,646 | A | * | 6/1956 | Hall | 43/42.15 |
| 2,769,268 | A | * | 11/1956 | Miller | 43/42.36 |
| 2,794,288 | A | * | 6/1957 | Marshall et al. | 43/42.15 |
| 2,847,791 | A | * | 8/1958 | Simmons | 43/42.39 |
| 2,886,914 | A | * | 5/1959 | Lievense | 43/42.15 |
| 2,932,112 | A | * | 4/1960 | Graves, Jr. | 43/42.15 |
| 2,938,293 | A | * | 5/1960 | Richardson | 43/42.39 |
| 2,986,837 | A | * | 6/1961 | Spugios | 43/42.15 |
| 3,054,209 | A | | 9/1962 | Wiley, Jr. | |
| 3,139,695 | A | * | 7/1964 | Makowski | 43/42.36 |
| 3,141,255 | A | | 7/1964 | Randall | |
| 3,218,750 | A | * | 11/1965 | Lewin | 43/42.36 |
| 3,456,378 | A | * | 7/1969 | Adams | 43/42.39 |
| 3,543,430 | A | * | 12/1970 | Brokaw | 43/42.05 |
| 3,740,891 | A | * | 6/1973 | Rubenstein | 43/42.15 |
| 3,751,842 | A | * | 8/1973 | Smith | 43/42.47 |
| 3,757,450 | A | * | 9/1973 | Martinez et al. | 43/42.15 |
| 3,897,647 | A | * | 8/1975 | Black | 43/42.38 |
| 4,138,791 | A | * | 2/1979 | Anson | 43/42.15 |
| 4,141,171 | A | * | 2/1979 | Muddiman | 43/42.47 |
| 4,414,772 | A | * | 11/1983 | Duncan | 43/42.36 |
| 4,477,994 | A | * | 10/1984 | Erickson | 43/42.48 |
| 4,495,722 | A | | 1/1985 | Hess et al. | |
| 4,642,933 | A | * | 2/1987 | Brown | 43/42.36 |
| 4,672,766 | A | * | 6/1987 | Mattison | 43/42.36 |
| 4,738,047 | A | * | 4/1988 | Ryan | 43/42.39 |
| 4,823,495 | A | * | 4/1989 | Camilleri | 43/42.36 |
| 4,908,975 | A | * | 3/1990 | Root et al. | 43/42.39 |
| 5,115,592 | A | * | 5/1992 | Renaud | 43/42.47 |
| 5,129,175 | A | * | 7/1992 | Pixton | 43/42.36 |
| 5,152,094 | A | * | 10/1992 | Strickland | 43/42.36 |
| 5,216,830 | A | * | 6/1993 | Brott, II | 43/42.39 |
| D349,148 | S | * | 7/1994 | Followell | D22/133 |
| 5,339,560 | A | * | 8/1994 | LeMaster | 43/42.45 |
| 5,369,906 | A | * | 12/1994 | Anterni | 43/42.48 |
| 5,379,543 | A | * | 1/1995 | Avent | 43/42.15 |
| 5,406,738 | A | * | 4/1995 | Holleman, Sr. | 43/42.15 |
| 5,477,634 | A | | 12/1995 | Welcome | 43/42.48 |
| 5,490,345 | A | * | 2/1996 | Infinger | 43/42.36 |
| 5,491,927 | A | * | 2/1996 | Ortiz | 43/42.39 |
| 5,546,694 | A | * | 8/1996 | Wilkinson | 43/42.39 |
| 5,560,141 | A | * | 10/1996 | Hodgin | 43/42.15 |
| 5,566,497 | A | * | 10/1996 | Oesterreich | 43/42.15 |
| 5,787,633 | A | * | 8/1998 | Taylor | 43/42.36 |
| 5,829,183 | A | * | 11/1998 | Guerin | 43/42.15 |
| 5,937,569 | A | * | 8/1999 | Solheim et al. | 43/42.47 |
| 6,006,465 | A | * | 12/1999 | Brown et al. | 43/42.36 |
| 6,041,540 | A | * | 3/2000 | Potts | 43/42.47 |
| 6,158,162 | A | * | 12/2000 | Loniello | 43/42.13 |
| 6,170,191 | B1 | * | 1/2001 | Laney | 43/43.13 |
| 6,185,857 | B1 | * | 2/2001 | Hnizdor | 43/42.11 |
| 6,430,867 | B1 | * | 8/2002 | Johnston et al. | 43/42.39 |
| 6,484,434 | B1 | * | 11/2002 | Elges | 43/42.47 |
| 7,059,080 | B2 | * | 6/2006 | Bendel | 43/42.15 |
| 7,140,147 | B2 | * | 11/2006 | Wacha | 43/42.39 |
| 7,234,266 | B2 | * | 6/2007 | Thomas | 43/42.36 |
| 7,356,963 | B2 | * | 4/2008 | Scott | 43/42.15 |
| 7,437,849 | B2 | * | 10/2008 | Selvaggio | 43/42.15 |
| 7,497,045 | B1 | * | 3/2009 | Crowe et al. | 43/42.39 |
| 7,614,178 | B2 | * | 11/2009 | Hoyt | 43/42.39 |
| 7,621,068 | B1 | * | 11/2009 | Renosky | 43/42.15 |
| 7,716,871 | B1 | * | 5/2010 | Sayers | 43/42.48 |
| 8,646,203 | B2 | * | 2/2014 | Pennaz | 43/42.15 |
| 2001/0045048 | A1 | * | 11/2001 | Johnson | 43/42.39 |
| 2002/0189150 | A1 | * | 12/2002 | Thorne | 43/42.15 |
| 2004/0107628 | A1 | * | 6/2004 | Mueller | 43/42.39 |
| 2004/0216358 | A1 | * | 11/2004 | Brandt | 43/42.19 |
| 2004/0231225 | A1 | * | 11/2004 | Okada | 43/42.36 |
| 2005/0246940 | A1 | * | 11/2005 | Jones et al. | 43/42.39 |
| 2006/0053680 | A1 | * | 3/2006 | Petitjean | 43/42.47 |
| 2006/0112607 | A1 | * | 6/2006 | Snyder | 43/42.15 |
| 2006/0112608 | A1 | * | 6/2006 | Snyder | 43/42.15 |
| 2006/0260176 | A1 | * | 11/2006 | Yeung | 43/42.15 |
| 2007/0107295 | A1 | * | 5/2007 | Kaptis | 43/42.39 |
| 2007/0119090 | A1 | * | 5/2007 | Searcy | 43/42.47 |
| 2008/0172924 | A1 | | 7/2008 | Thorne | |
| 2008/0202013 | A1 | * | 8/2008 | Moffitt | 43/42.15 |
| 2008/0202017 | A1 | * | 8/2008 | Gregory | 43/42.39 |
| 2008/0313948 | A1 | * | 12/2008 | Lewis | 43/42.39 |
| 2009/0307960 | A1 | * | 12/2009 | Oelerich et al. | 43/42.39 |
| 2010/0175305 | A1 | * | 7/2010 | Heikkila et al. | 43/42.39 |
| 2011/0035987 | A1 | * | 2/2011 | Nicholson, III | 43/42.47 |
| 2011/0239521 | A1 | * | 10/2011 | Tsai | 43/42.15 |

* cited by examiner

DOUBLE FISHING LURE

BACKGROUND OF THE INVENTION

Field of the Invention

The present invention relates to a fishing lure.

Fishing lures are well known for use in catching fish. Fishing lures are typically attached to an end of a fishing line and designed to attract a fish to bite on a hook attached to the fishing lure. Fishing lures are designed to simulate or resemble a natural food source (e.g., a bait fish) for the fish both in appearance and in movement. The present invention provides improvements over the prior art fishing lures.

SUMMARY OF THE INVENTION

One aspect of the present invention is a fishing lure that includes a leading lure body shaped like a fish, and a trailing lure body shaped like a fish. The leading lure body includes a passage therethrough to enable a fishing line to slidably pass through the passage for connection to the trailing lure body. The trailing lure body includes a front portion and a curved front surface. The front portion of the trailing lure body is weighted such that the trailing lure body tends to sink front portion first in water. The curved front surface of the trailing fishing lure facilitates a swimming motion for the trailing lure body when the trailing lure body moves through water, and tends to lift the trailing lure body if the trailing lure body is pulled through water.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF THE INVENTION

Figure 1:
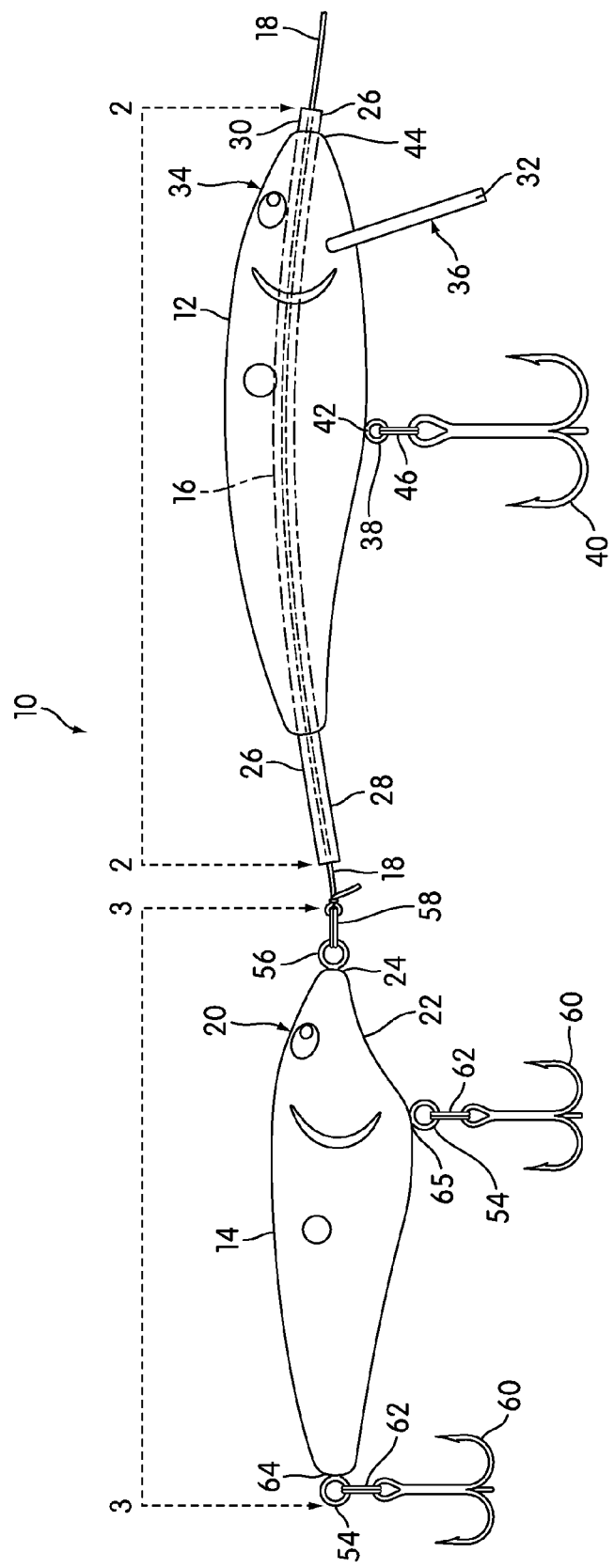
FIG. 1 shows a right side view of a fishing lure that includes a leading lure body and a trailing lure body, where the leading lure body includes a passage to enable a fishing line to slidably pass through the passage for connection to the trailing lure body in accordance with an embodiment of the present invention.

FIG. 1 shows a fishing lure 10 in accordance with an embodiment of the invention. The fishing lure 10 includes a leading lure body 12 shaped like a fish, and a trailing lure body 14 shaped like a fish. The leading lure body 12 includes a passage 16 therethrough to enable a fishing line 18 to slidably pass through the passage 16 for connection to the trailing lure body 14. The trailing lure body 14 includes a front portion 20 and a curved front surface 22. The front portion 20 of the trailing lure body 14 is weighted such that the trailing lure body 14 tends to sink front portion 20 first in water. The curved front surface 22 of the trailing fishing lure 14 facilitates a swimming motion for the trailing lure body 14 when the trailing lure body 14 moves through water, and tends to lift the trailing lure body 14 if the trailing lure body 14 is pulled through water.

In one embodiment, which is non-limiting, the leading lure body 12 can weigh between 4 to 8 grams. In one embodiment, for example, it weighs about 6 grams. In one embodiment, which is non-limiting, the leading lure body 12 can be between 2.0 to 5.0 inches long. In the illustrated embodiment of FIG. 2, it is 3.5 inches long. In one non-limiting embodiment, the width of the leading lure body 12 is between 0.4 to 0.8 inches. In the illustrated embodiment, it is 0.6 inches. In one non-limiting embodiment, the height of the leading lure body 12 is between 0.6 to 1.0 inches. In the illustrated embodiment, it is 0.82 inches.

Figure 2:
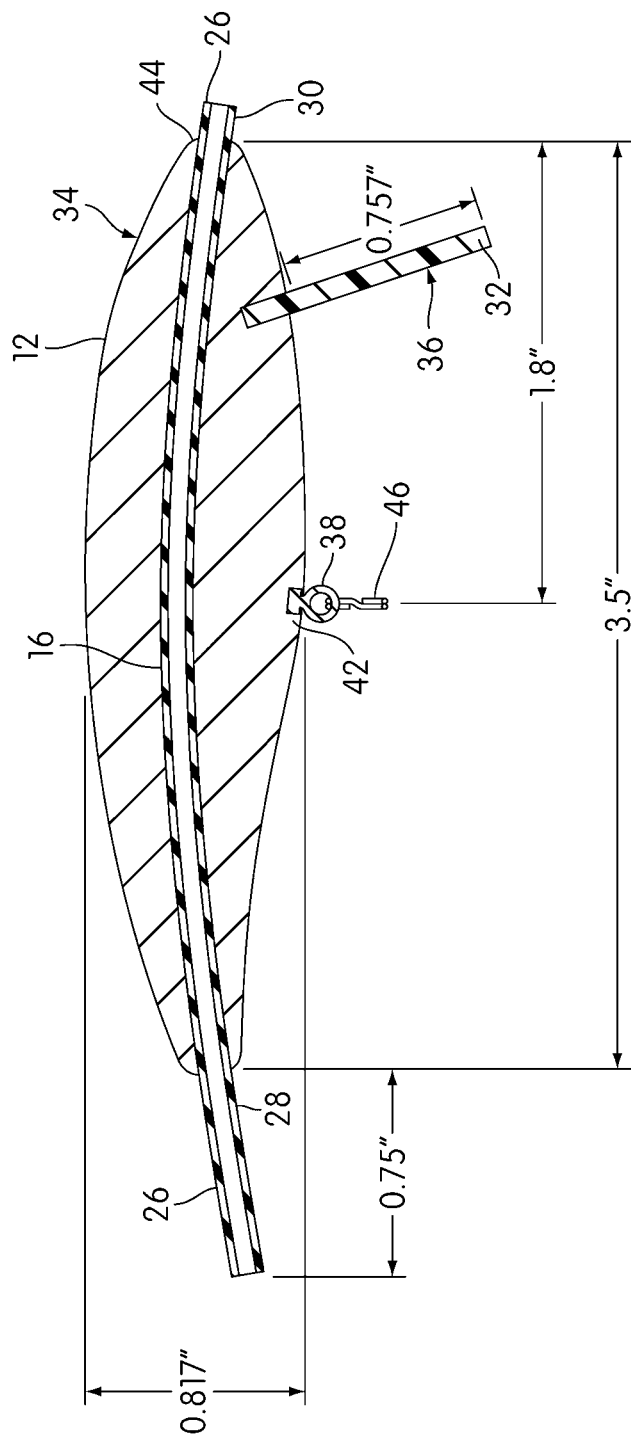
FIG. 2 shows a cross-sectional view of the leading lure body taken through the line 2-2 axis of FIG. 1.

In one embodiment, the leading lure body 12 includes a tube 26 extending at least rearwardly from the leading lure body 12 to define a trailing portion 28 of the passage 16. The trailing portion 28 is constructed and arranged to keep the leading lure body 12 and the trailing lure body 14 spaced from each other. In the illustrated embodiment, as shown in FIG. 2, the trailing portion 28 extending from the leading lure body 12 is between 0.5 and 1.0 inches long, such as 0.75 inches long. In one embodiment, the leading lure body 12 includes a portion of the tube 26 that is constructed and arranged to extend forwardly from the leading lure body 12 to define a leading portion 30 of the passage 16.

In one embodiment, the leading lure body 12 is made from a light weight floatable material such that the leading lure body 12 tends to float in water if the leading lure body 12 is pulled through water. In one embodiment, the leading lure body 12 is made from a light weight plastic material, wood, or any other material that facilitates the leading lure body 12 to float in water.

In one embodiment, the trailing portion 28 and the leading portion 30 are made of light weight floatable material. In one embodiment, the trailing portion 28 and the leading portion 30 are made from a light weight plastic material, or any other material that facilitates the trailing portion 28 and the leading portion 30 floating in water with the leading lure body 12.

In one embodiment, the leading lure body 12 includes a lip 32 having a downwardly and forwardly extending orientation relative to a front portion 34 of the leading lure body 12. In one embodiment, the lip 32 of the leading lure body 12 generally between 0.25 and 0.75 inches wide, such as about 0.5 inches wide. In one embodiment, as shown in FIG. 2, an exposed portion 36 of the lip 32 extending from the leading lure body 12 generally between 0.5 to 1.0 inches long, such as about 0.76 inches long.

In one embodiment, the leading lure body 12 includes one or more loops 38. The loop 38 is constructed and arranged to facilitate attachment of a hook 40 to the leading fishing lure 12. In the illustrated embodiment, as shown in FIGS. 1 and 2, the loop 38 is positioned in a central portion 42 of the leading lure body 12. In the illustrated embodiment, as shown in FIG. 2, the loop 38 is generally positioned at a distance between about 1.5 to 2.1 inches from a front end 44 of the leading lure body 14, such as about 1.8 inches from the front end 44 of the leading lure body 12. The loop 38 may be connected to the hook 40 using a ring 46. In one embodiment, the hook 40 is a three pronged hook (or a "treble hook"). For example, in one embodiment, the hook 40 is a #4 treble hook or a #2 treble hook. In another embodiment, the hook 40 may include a single hook or a double hook.

Figure 3:
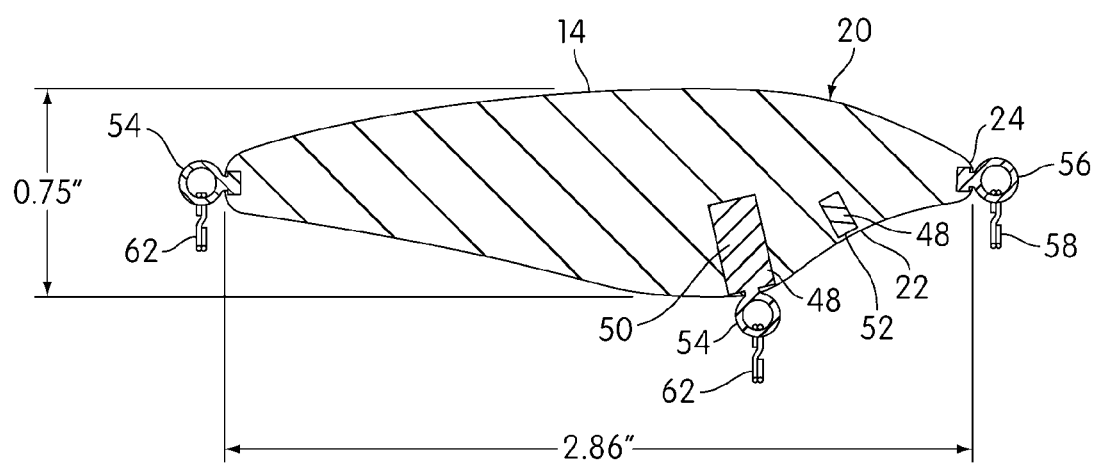
FIG. 3 shows a cross-sectional view of the trailing lure body taken through the line 3-3 axis of FIG. 1.

In one embodiment, the trailing lure body 14 generally between 10 and 12 grams, such as about 10.9 grams. In the illustrated embodiment, as shown in FIG. 3, the trailing lure body 14 generally between about 2.5 to about 3.5 inches long, such as about 2.86 inches long. The maximum width of the trailing lure body 14 generally is between about 0.3 to 0.7 inches, such as about 0.50 inches, while the maximum height of trailing lure body 14 is about 0.5 to 1.0 inches, such as about 0.75 inches.

In the illustrated embodiment, as shown in FIG. 3, the front portion 20 of the trailing lure body 14 is weighted using a weight 48. The weight 48 tends to sink the front portion 20 of the trailing lure body 14 first in water, if the leading lure body 12 and the trailing lure body 14 are not pulled through water. In the illustrated embodiment, as shown in FIG. 3, the weight 48 may distributed in the front portion 20 of the trailing lure body 14 to include a first weight 50 and a second weight 52. In one non-limiting embodiment, the first weight 50 in the trailing lure body 14 weighs between 4 to 6 grams, such as about. In the illustrated embodiment of FIG. 3, it weighs about 5 grams. In one non-limiting embodiment, the second weight 52 in the trailing lure body 14 weighs between 1.3 to 1.9 grams. In the illustrated embodiment of FIG. 3, it weighs about 1.6 grams. In the illustrated embodiment, as shown in FIG. 3, the first weight 50 is positioned just above a loop 54 of the trailing lure body 14, and the second weight 52 is positioned between the first weight 50 and the front portion 20 of the trailing lure body 14. However, it is contemplated that the first weight 50 and the second weight 52 may be positioned anywhere in the front portion 20 of the trailing lure body 14 so as to provide the front portion 20 of the trailing lure body with the weighted configuration in comparison with a rearward portion. Also, it should be appreciated that the trailing lure body 14 can be weighted in a variety of different ways to sink the trailing lure body front end first in water. Indeed, in another embodiment, the material forming the body shape of the fish itself can be made heavy in the front portion 20 so as to sink the front portion 20 of the trailing lure body 14 first in water. It is also contemplated that different shapes, configurations, and/or constructions of the weight 48 can be provided.

In one embodiment, the trailing lure body 14 includes a fishing line loop 56 located at the front portion 20 of the front portion 20. The fishing line loop 56 is constructed and arranged to facilitate attachment of the trailing lure body 14 to the fishing line 18. The trailing lure body 14 may be connected to the fishing line 18 at the fishing line loop 56 by any attachment mechanism, such as tying the fishing line 18 to the fishing line loop 56. In one embodiment, the fishing line 18 is secured directly to the fishing line loop 56. In another embodiment, as shown in FIG. 1, the fishing line 18 is connected to the fishing line loop 56 by using a connector, such as a ring 58.

In one embodiment, the trailing lure body 14 includes one or more loops 54 (two are shown in the illustrated embodiment in FIG. 1). The loops 54 are constructed and arranged to facilitate attachment of hooks 60 to the trailing fishing lure 14. The loops 54 may be connected to the hooks 60 using rings 62. In the illustrated embodiment, the hooks 60 are three pronged hooks or treble hooks. For example, in one embodiment, the hooks 60 are #6 or #4 treble hooks. In another embodiment, the hooks 60 may include single hooks or a double hooks. In the illustrated embodiment, the hooks 60 are positioned near a central portion 65 and in a rear end portion 64 of the trailing lure body 14. However, it is contemplated that the hooks 60 may be positioned anywhere on the trailing lure body 14.

In one embodiment, the curved front surface 22 includes a concave, cup-shaped configuration that provides for a serpentine or swimming-like motion for the trailing lure body 14, when the trailing lure body 14 moves through water (i.e., when pulled by the fishing line 18). The curved front surface 22 also tends to lift the trailing lure body 14 if the trailing lure body 14 is pulled through water. If the trailing lure body 14 is pulled through water, the curved front surface 22 tends to receive an upward force exerted upon the front surface 22 by water, causing the trailing lure body 14 to lift.

In one embodiment, a color coating is applied to the leading lure body 12 and the trailing lure body 14. For example, an air brushing technique can be used. In one embodiment, a holographic pattern of the fish is transferred to and adhered to surface of the leading lure body 12 and surface of the trailing lure body 14 using hot stamping technique. In one embodiment, the hot stamping technique is performed prior to applying the color coating to the leading lure body 12 and the trailing lure body 14. The colors or color combinations used during the color coating process allow the leading lure body 12 and the trailing lure body 14 each to resemble a fish and to help attract target species of fish. In one embodiment, the colors and color combinations are used to provide a plurality of patterns on the outer surfaces of the leading lure body 12 and the trailing lure body 14 so that the plurality of patterns formed on the outer surfaces resemble scales, fins and gill cover of a fish. In another embodiment, gill cover (not shown) and scales (not shown) may be formed on the outer surfaces of the leading lure body 12 and the trailing lure body 14, prior to applying the color coating to the of the leading lure body 12 and the trailing lure body 14.

The operation of the fishing lure 10 is described in detail with respect to FIGS. 4-8. The fishing lure 10, thus formed, is generally connected to an end of the fishing line 18, which may be connected to a fishing rod and a reel (not shown). In particular, the fishing line 18 is constructed and arranged to slidably pass through the leading portion 30, the passage 16 of the leading lure body 12, and the trailing portion 28 for connection to the trailing lure body 12. As noted above, the fishing line 18 is connected with the fishing line loop 56, through the ring 58, located at the front portion 20 of the front portion 20 of the trailing lure body 14. The fishing lure 10 is then cast into areas of water where target species of fish may be found. The fishing lure 10 may be skillfully moved in the areas of water to attract target species of fish, and to encourage the target species of fish to bite the fishing lure 10.

The trailing portion 28 prevents the leading lure body 12 and the trailing lure body 14 from touching each other. This configuration of the fishing lure 10 where the leading lure body 12 and the trailing lure body 14 are prevented from touching each other (i.e., the leading lure body 12 and the trailing lure body 14 are separated from each other) provides an illusion of two fish swimming, when the fishing lure 10 is pulled through water (e.g., see FIG. 5).

Figure 4:
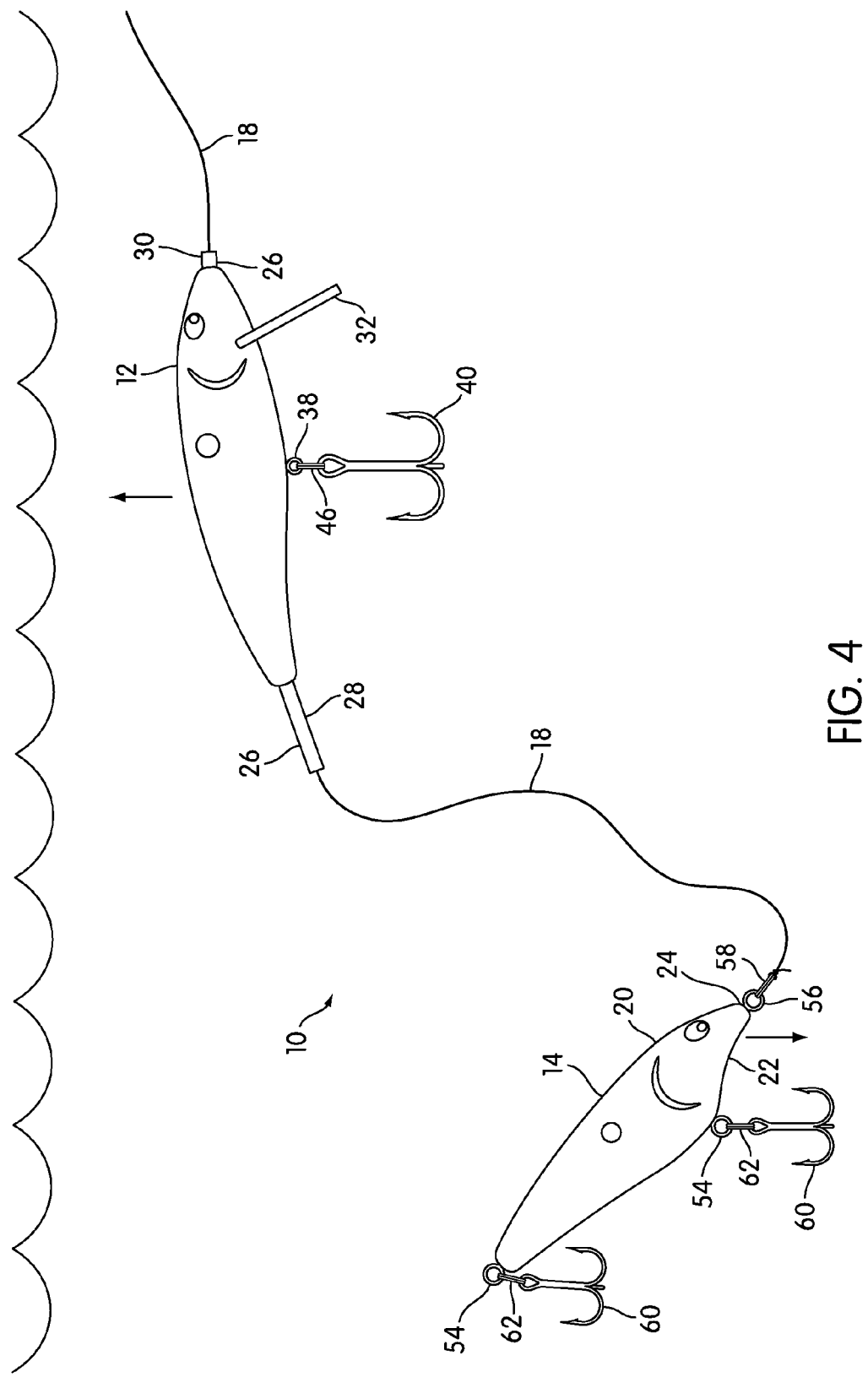
FIG. 4 shows a right side view of the fishing lure wherein the trailing fishing lure tends to sink front portion first in water and the leading fishing lure tends to float in water when the leading fishing lure and the trailing fishing lure are not pulled through water in accordance with an embodiment of the present invention.
Figure 7:
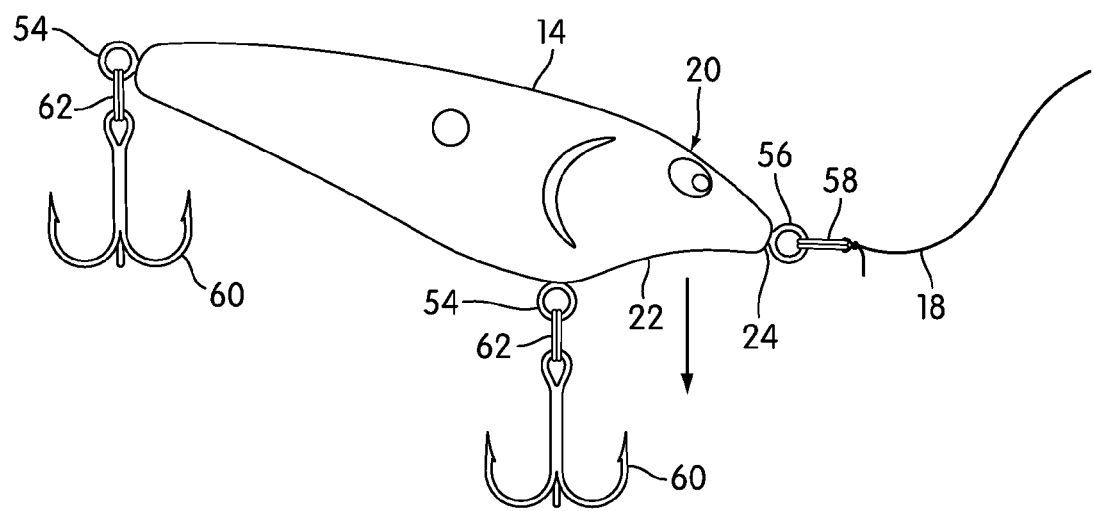
Figure 8:
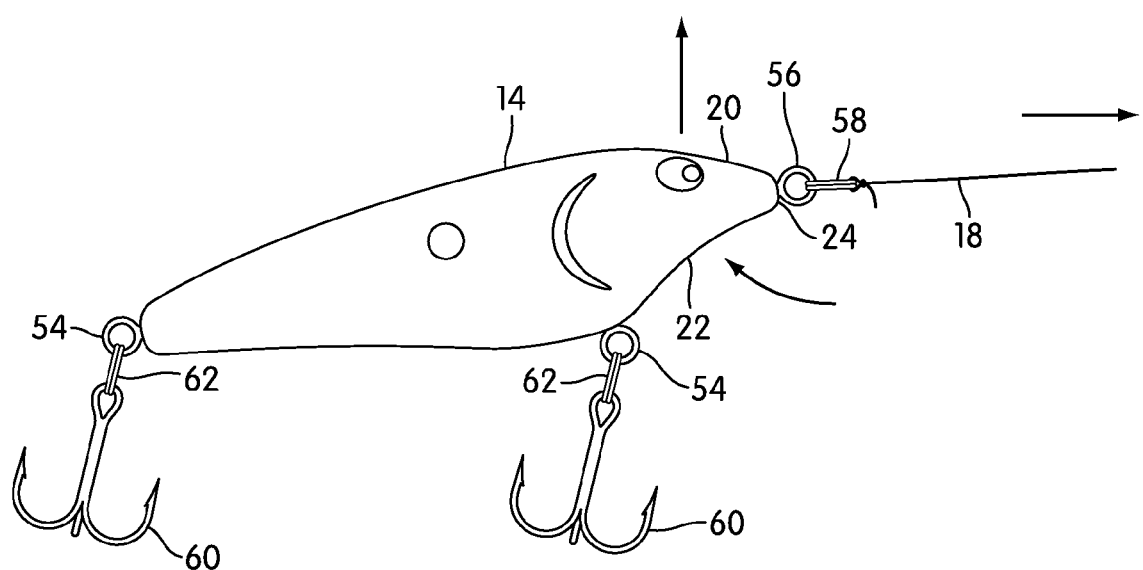
FIG. 8 shows a right side view of the trailing fishing lure, wherein the curved front surface of the trailing fishing lure tends to lift the trailing fishing lure if the trailing fishing lure is pulled through water in accordance with an embodiment of the present invention.

When the fishing lure 10 is stopped (i.e., when both the leading lure body 12 and the trailing lure body 14 of the fishing lure 10 are suspended in water without being pulled through water), the trailing lure body 14 tends to sink the front portion 20 first in water as shown in FIGS. 4 and 7. As noted above, the front portion 20 of the trailing lure body 14 is weighted. This weighted configuration of the front portion 20 of the trailing lure body 14 tends to sink the front portion 20 of the trailing lure body 14 first in water if the leading lure body 12 and the trailing lure body 14 are not pulled through water.

As noted above, the weight 48 in the front portion 20 of the trailing lure body 14 is positioned to sink the front portion 20 of the trailing lure body 14 first in water, when the fishing lure 10 is suspended in water without being pulled through water. In other words, when the fishing lure 10 comes to a standstill, the weight 48 in the front portion 20 of the trailing lure body 14 makes the front portion 20 of the trailing lure body 14 of the fishing lure 10 heavy, thus, sinking the front portion 20 of the trailing lure body 14 first in water. Thus, the trailing lure body 14 tends to sink with the front portion 20 first (relative to the rear end) in water (as shown in FIG. 4).

As shown in FIG. 4, if there is slack in the fishing line 18, the leading lure body 12 and the trailing lure body 14 tends to separate from each other because the leading lure body 12 is configured to slide relative to the fishing line 18. Also, as shown in FIG. 4, if there is slack in the fishing line 18, the leading lure body 12 and the trailing lure body 14 tend to separate from each other with the leading lure body 12 floating and the weighted trailing lure body 14 sinking.

When the fishing line 18 is pulled (i.e., if the leading lure body 12 and the trailing lure body 14 are pulled through water), the curved front surface 22 of the trailing lure body 14 causes the trailing lure body 14 to lift, and pulls the trailing lure body 14 closer to the leading lure body 12. As the fishing lure 10 is pulled through water, the curved front surface 22 of the trailing lure body 14 facilitates a swimming motion for the trailing lure body 14 that may catch the attention of the target species of fish.

Figure 5:
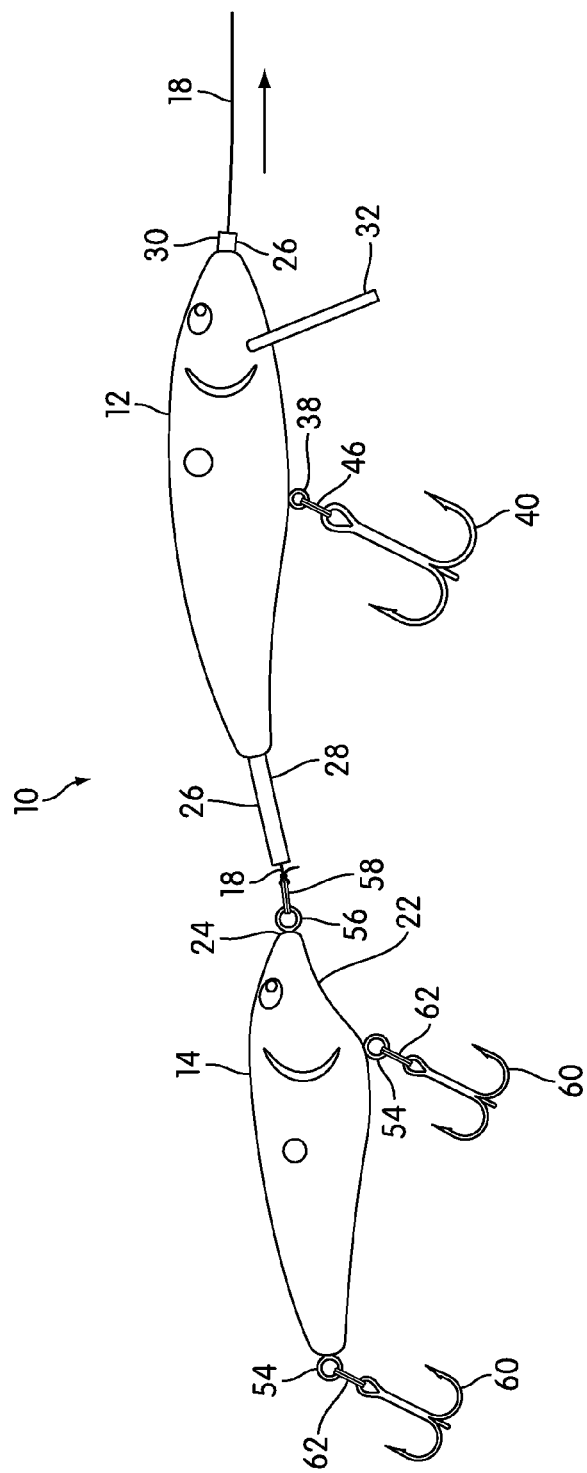
FIG. 5 shows a right side view of the fishing lure, wherein a curved front surface of the trailing fishing lure tends to lift the trailing fishing lure if the trailing fishing lure is pulled through water in accordance with an embodiment of the present invention.
Figure 6:
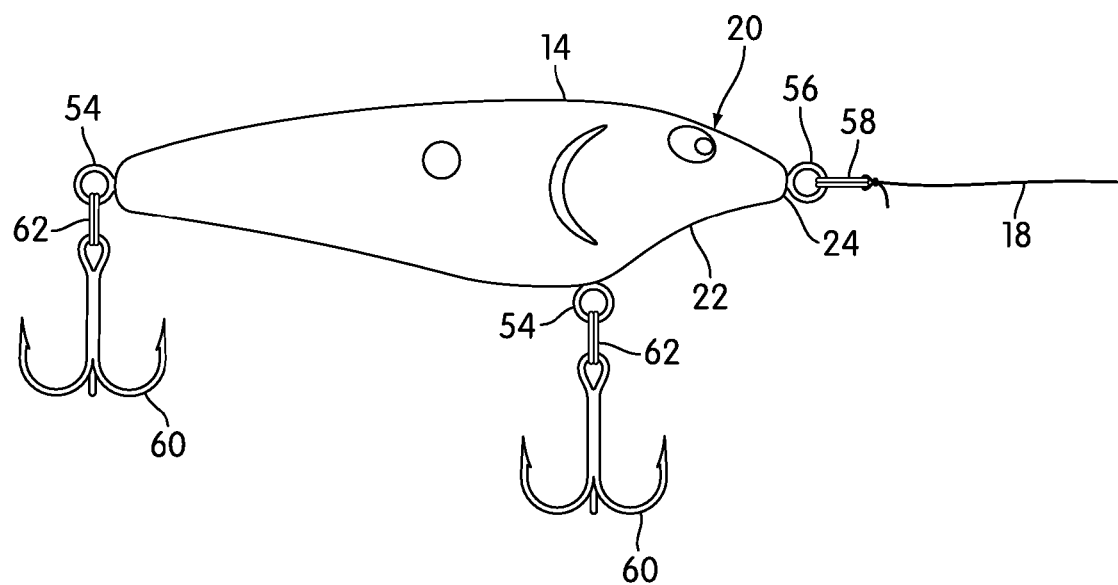
FIGS. 6 and 7 show right side views of the trailing fishing lure, wherein the trailing fishing lure tends to sink front portion first in water when the trailing fishing lure is not pulled through water in accordance with an embodiment of the present invention.

As shown in FIGS. 4 and 5, the distance between the leading lure body 12 and the trailing lure body 14 gets longer when the front edge 24 of the trailing lure body 14 sinks, and the distance between the leading lure body 12 and the trailing lure body 14 gets shorter when the trailing lure body 14 is pulled by the fishing line 18.

The leading lure body 12 is constructed and arranged to provide a waking action on the surface of water when the fishing lure 10 is pulled through water, and the trailing lure body 14 is constructed and arranged to sink in water with erratic action (i.e., until stopped) when the fishing lure 10 is not pulled through water.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A fishing lure comprising:
a buoyant leading lure body shaped like a fish;
a trailing lure body shaped like a fish, including eyes, the eyes being disposed at a front portion of the fish-shaped trailing lure body, the leading lure body having a passage therethrough to enable a fishing line to slidably pass through the passage for connection to the fish-shaped trailing lure body,
the fish-shaped trailing lure body having a rear portion, the fish-shaped trailing lure body being weighted unevenly within its fish shape such that the front portion of the fish-shaped trailing lure body is weighted more heavily than the rear portion such that the fish-shaped trailing lure body tends to sink front portion first in water, the leading lure body being more buoyant than the trailing lure body,
the fish-shaped trailing lure body having a concave curved front surface, the concave curved front surface being disposed on an underside of the front portion of the fish-shaped trailing lure body such that the concave curved front surface faces downward in a direction away from the eyes of the fish-shaped trailing lure body, wherein the concave curved front surface being constructed and arranged to:
(a) facilitate a swimming motion for the fish-shaped trailing lure body such that the fish-shaped trailing lure body is pulled closer to the fish-shaped leading lure body when the fish-shaped trailing lure body moves through water; and
(b) receive an upward force exerted thereon by water causing the fish-shaped trailing lure body to lift if the fish-shaped trailing lure body is pulled through water; and
a loop for connecting to a fishing line, the loop being connected with the front portion of the fish-shaped trailing lure body, forwardly of the eyes, so that when the trailing lure body is pulled through water by the line, it is pulled front portion first via the loop, with the downwardly facing concave curved front surface disposed at the underside of the front portion of the fish-shaped trailing body when it is pulled front portion first via the loop,
the fish-shaped trailing lure body appearing to swim away from the fish-shaped leading lure body when the fish-shaped trailing lure body sinks in the water with its front portion first, and appearing to swim towards the fish-shaped leading lure body in the swimming motion facilitated by the concave curved front surface when the fish-shaped trailing lure body is pulled through the water by the line.

2. A fishing lure of claim 1, wherein the leading lure body further comprising a tube extending at least rearwardly from a rearward end of the leading lure body to define a trailing portion of the passage, the tube preventing the leading lure body and the trailing lure body from touching each other.

3. A fishing lure of claim 2, wherein the tube extends at least forwardly from the leading lure body to define a leading portion of the passage.

4. A fishing lure of claim 2, wherein the configuration of the fishing lure with its leading lure body separated from its trailing lure body by the tube, when the fishing lure is pulled through water, provides an illusion of two fish swimming.

5. A fishing lure of claim 1, wherein the leading lure body is made from a light weight material such that the leading lure body tends to float in water if the leading lure body is pulled through water.

6. A fishing lure of claim 1, wherein the leading lure body further comprising a lip having a downwardly and forwardly extending orientation relative to a front portion of the leading lure body.

7. A fishing lure of claim 1, wherein the leading lure body having one or more hook connecting loops, the one or more hook connecting loops are constructed and arranged to facilitate attachment of hooks to the leading fishing lure.

8. A fishing lure of claim 1, wherein the trailing lure body having one or more hook connecting loops, the one or more hook connecting loops are constructed and arranged to facilitate attachment of hooks to the trailing fishing lure.

9. A fishing lure of claim 1, wherein the passage through the leading body lure has an exit that is disposed at a rearward end thereof, such that the trailing lure body appears to be trailing the leading lure body when being pulled by the line.

10. A fishing lure of claim 1, wherein the swimming motion comprises a serpentine motion.

11. A fishing lure of claim 1, wherein the leading lure body is constructed and arranged to provide a waking action on the surface of water when the fishing lure is pulled through water.

12. A fishing lure of claim 1, wherein the trailing lure body is constructed and arranged to sink in water with erratic action until stopped when the fishing lure is not pulled through water.

* * * * *